US006851030B2

(12) United States Patent
Tremaine (10) Patent No.: US 6,851,030 B2
(45) Date of Patent: Feb. 1, 2005

(54) SYSTEM AND METHOD FOR DYNAMICALLY ALLOCATING ASSOCIATIVE RESOURCES

(75) Inventor: Robert B Tremaine, Stormville, NY (US)

(73) Assignee: International Business Machines Corporation, Armonk, NY (US)

(*) Notice: Subject to any disclaimer, the term of this patent is extended or adjusted under 35 U.S.C. 154(b) by 294 days.

(21) Appl. No.: 10/271,577

(22) Filed: Oct. 16, 2002

(65) Prior Publication Data

US 2004/0078532 A1 Apr. 22, 2004

(51) Int. Cl.[7] .............................................. G06F 12/02
(52) U.S. Cl. ........................ 711/160; 711/153; 711/170; 711/171; 711/172; 711/173
(58) Field of Search ................................ 711/118, 133, 711/153, 160, 170–173

(56) References Cited

U.S. PATENT DOCUMENTS 4,035,778 A * 7/1977 Ghanem ...................... 711/133
5,297,265 A * 3/1994 Frank et al. ................. 711/202
RE36,989 E * 12/2000 White .......................... 711/118

* cited by examiner

Primary Examiner—T Nguyen
(74) Attorney, Agent, or Firm—McGinn & Gibb, PLLC; Derek S. Jennings, Esq.

(57) ABSTRACT

A method and structure for balancing associative resource (e.g., cache lines or buffers) allocation with respect to load, wherein said resources are allocated/deallocated to requesting processes or "agents" based on their reference history and demand. User agents that fail to meet minimum use criteria, are forced to relinquish logically allocated resources to high demand agents. Otherwise, an agent maintains control of its resources in the presence of other high demand agents, without cross-agent thrashing for resources. An associative resource "pool" is logically divided into m partitions. A small "partition reference" counter is employed for each partition to record its usage history. A global "persistence reference" counter functions to erase the "set reference" counter history at a programmable rate. Low "partition reference" counter values imply low usage, and make partition resources available to high usage partition(s) when needed. Programmable thresholds permit "weighting" the criteria for system optimization.

32 Claims, 5 Drawing Sheets

SYSTEM AND METHOD FOR DYNAMICALLY ALLOCATING ASSOCIATIVE RESOURCES

BACKGROUND OF THE INVENTION

1. Field of the Invention

The present invention relates, in general, to the field of memory resource management in computer systems, more specifically to an improved method and apparatus for allocation and replacement of associative storage resources (e.g., cache lines and buffers).

2. Description of the Related Art

Conventional systems utilize computer and other data processing systems implemented in "hardware" often employ arrays of storage buffers and registers for local high-speed access to the contents by processes or "agents". Since these resources are limited in size and amount, methods are employed to constantly reallocate the resources to meet the changing demands of competing agents. Most often these resources hold information for a short time for a given agent, before the resource is reallocated to accommodate new demands.

Associative hardware resource management techniques and algorithms address the tradeoff between speed and both cost and complexity, while functioning to use available resources as efficiently as possible. The least recently used (LRU) algorithm is commonly used to manage a limited set of associative resources within a partition. The algorithm suggests reallocating the least recently used resource to a current or pending demand. However, when multiple agents via for resources within the same resource partition, it is possible for one or more agents to monopolize the resource set, thereby causing competing agents to repeatedly reallocate each others resources before they have had sufficient use of a resource. This "thrashing" can significantly degrade system performance as agents waste proportionally significant time waiting for a resource. This situation is particularly evident when managing the fully associative "open pages" within "virtual channel" SDRAM, where address ranges or "pages" are held in buffers within the SDRAM devices for high speed reference. Dividing a resource into multiple partitions can segregate potentially monopolistic agents from each other. However, this scheme can waste resources when an agent fails to use/need all the resources within its partition. Therefore, a need exists for dynamically reallocating resources from underutilized partitions to highly utilized partitions.

SUMMARY OF THE INVENTION

There is provided, according to one aspect of the invention, a system and method to reallocate buffer resources by using reference frequencies vs. miss rate for managing the distribution of storage resources to variable size logical partitions of a storage resource, to dynamically adapt to a plurality of agents vying for a limited set of resources. The invention desires to preclude agents from monopolizing a buffer resource. Moreover, the invention desires to provide buffer reallocation when needed, without retrying requests or waiting for periodic re-allocations.

It is the object of the invention to provide dynamically adaptable, load sensitive means for allocating associative hardware resources to processes or "agents" within a data processing system. Agents that fail to meet minimum use criteria, are forced to relinquish logically allocated resources to high demand agents. Otherwise, an agent maintains control of its resources in the presence of other high demand agents, without cross-agent thrashing for resources.

It is a further object of the invention to provide a method and apparatus to record the usage of associative resource "pool" that is logically divided into m partitions, provide a programmable persistence of said usage record, and to allocate resources based on these record's relationship to programmable thresholds and demand requirements.

An associative resource "pool" is logically divided into m partitions of nominal resource set size n. A small "partition reference" counter is employed for each partition to record its usage history. A global "persistence reference" counter functions to erase the "set reference" counter history at a programmable rate. Low "partition reference" counter values imply low usage, and make set resources available to high usage set(s) when needed. Programmable thresholds permit "weighting" the criteria for system optimization.

In the invention, the processing system connects to agents and to a memory having resources. The invention has a memory controller operatively connected to the memory, a directory operatively connected to the agents, and a resource management controller operatively connected to the directory. The resource management control is adapted to allocate a distribution of the resources into partitions. Each of the partitions is associated with at least one of the agents. The resource management control includes a replacement controller operatively connected to the memory controller and a counter operatively connected to the replacement controller that is adapted to record a usage history for each of the partitions. The replacement controller is adapted to reallocate the distribution of the resources within each of the partitions as a function of the usage history. In addition, the invention includes a threshold register for each of the partitions for storing a threshold, wherein a predetermined minimum allocation of the associative resources is maintained in each of the partitions that have a usage history above the threshold.

The counter is adapted to maintain a count for each partition of how frequently resources within the partitions are accessed. The replacement controller is further adapted to continuously reallocate the distribution of the resources and reallocate the distribution of the resources by adding resources to partitions with higher use levels and removing resources from partitions with lower use levels. The invention also includes a state register operatively connected to the replacement controller. The state register is adapted to identify the partition in which each resource is located. The state registers have an individual state register for each of the resources. The state registers include an identifier tag that identifies the partition in which each resource is located.

The invention also discloses a method for allocating associative resources among a plurality of agents. The invention allocates a distribution of the resources into partitions so that each of the partitions is associated with at least one of the agents. The invention records a usage history for each of the partitions and reallocates the distribution of the resources within each of the partitions as a function of the usage history. The invention repeats the recording and reallocating processes. The reallocating process adds resources to partitions with higher use levels and removes resources from partitions with lower use levels. The recording of the usage history maintains a count for each partition of how frequently resources within the partition are accessed.

The resources can only be reallocated between the partitions when the count exceeds a predetermined value. The allocating process attaches an identifier tag to the resources, and identifier tag identifies the partition in which each resource is located.

BRIEF DESCRIPTION OF THE DRAWINGS

The foregoing and other objects, aspects and advantages will be better understood from the following detailed description of a preferred embodiment(s) of the invention with reference to the drawings, in which.

DETAILED DESCRIPTION OF PREFERRED EMBODIMENTS OF THE INVENTION

Figure 1:
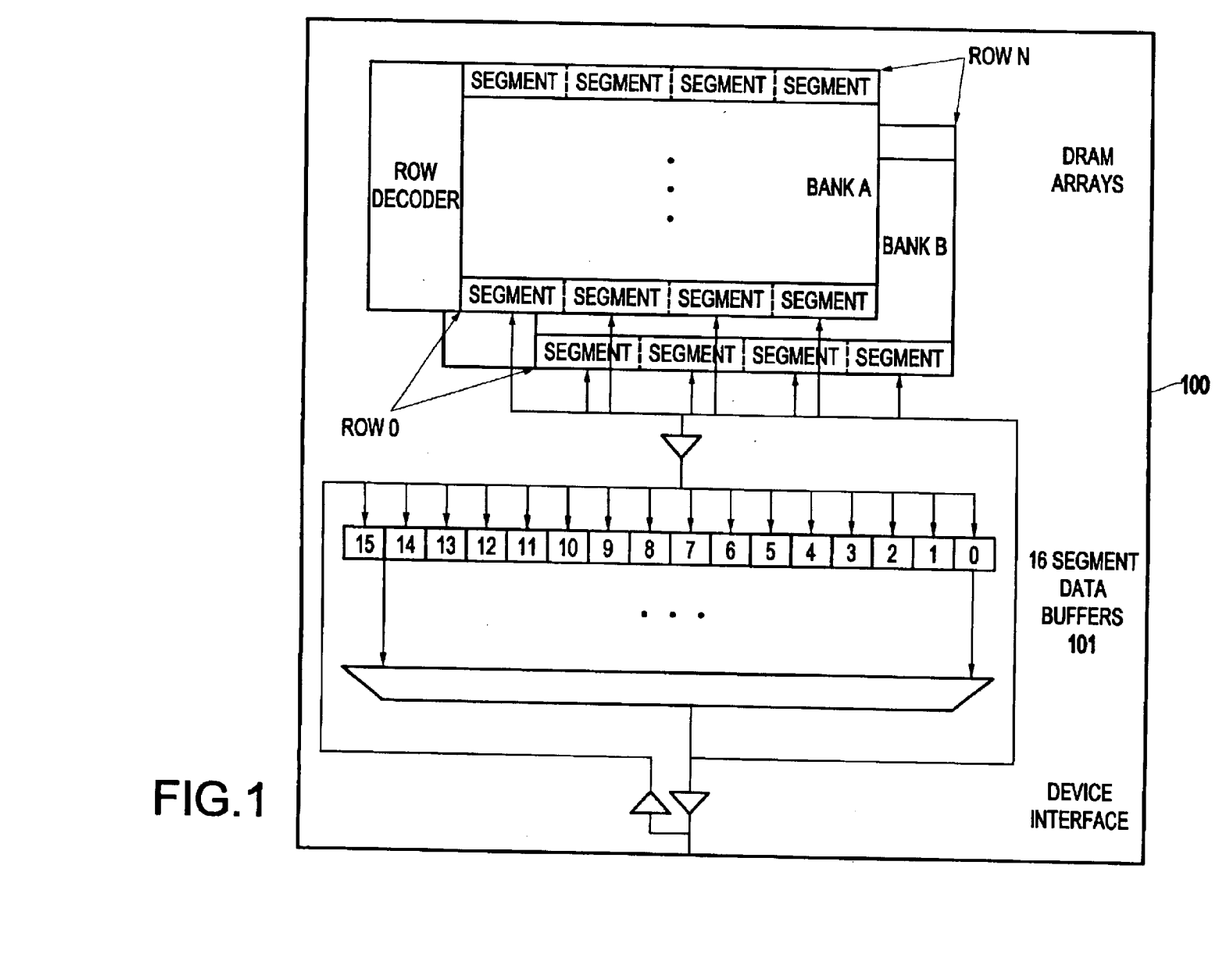
FIG. 1 illustrates an architectural block diagram of a Virtual Channel Memory device.

Referring now to the drawings, and more particularly to FIG. 1, there are shown preferred embodiments of the method and structures according to the present invention. The inherently high access latency associated with DRAM technology is mitigated by the "page mode" standard supported by SDRAM devices. This feature includes an internal low latency data register wide enough to contain an entire page or row of data bits from an associated internal bit array or "bank". The device interface protocol provides a means for a system application memory controller to "open" a row (load the register), "close" a row (write the register content back into the bank), or access the row register at low latency while it is "open". The system application memory controller functions to maintain as many "open" rows as are present in the system to achieve the lowest average access latency to the memory array. However, since only one row register is associated with a large block of storage, significant thrashing occurs when multiple processes request access to disjoint storage that involve independent rows for a given bank. This behavior can completely negate any advantage to maintaining open rows, and in some cases results in performance worse that maintaining no open rows (SDRAM auto-precharge mode).

Referring to FIG. 1, shown is a SDRAM device block diagram 100 that incorporates the advanced architecture, known as "Virtual Channel Memory (VCM)", incorporated herein by reference ("Virtual Channel Performance Analysis", NEC Electronics Inc., 1999) which incorporates 16 fully associative row segment registers 101, verses the standard four direct mapped row registers. The technology enables a high level of sophistication to be employed within a system application SDRAM controller to manage the SDRAM row segment registers efficiently to achieve the lowest average SDRAM read latency, resulting in the highest system performance.

It is the object of the invention to provide dynamically adaptable, reference load sensitive means for allocating associative hardware resources to processes or "agents" within a data processing system. One embodiment includes a hardware apparatus and method to efficiently utilize the associative row segment registers (buffers) within VCM devices by apportioning the buffers into partitions reserved for specific processors, where the memory controller hardware regulates processor access to memory through respective partitions in a multi-processor system. However, persons skilled in the art may recognize that the invention is readily applicable to efficient dynamic management of other associative resources within a data processing system.

Figure 2:
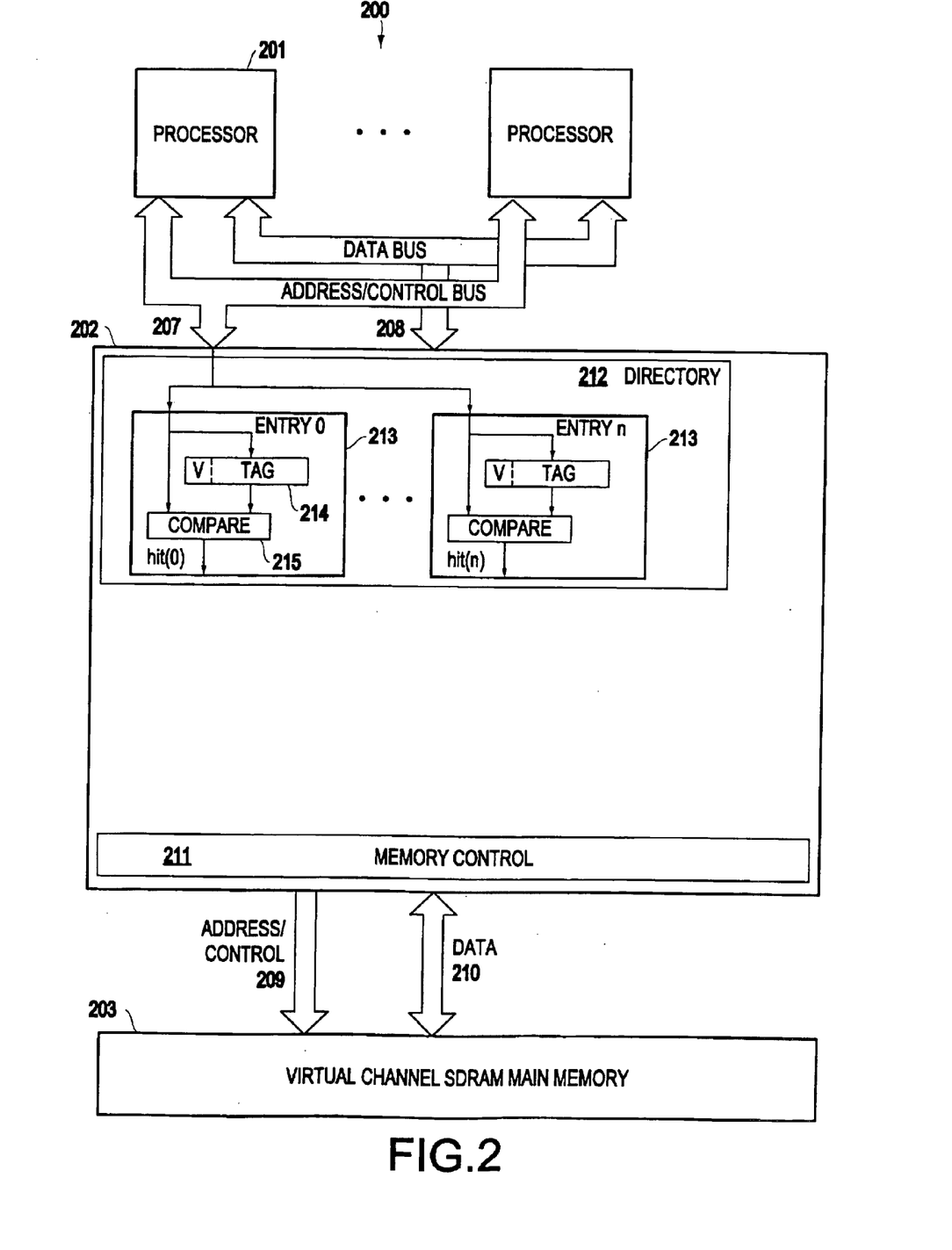
FIG. 2 illustrates a processing system having an associative directory for managing a Virtual Channel Memory array.

Referring to FIG. 2, shown is a processing system 200, having one or more processors 201 connected to a main memory comprised of VCM 203, through a memory controller device 202. All memory activity is controlled by state applied on address/control signals 209 (typically SDRAM RAS, CAS, Address, WE, CKE) by the conventional VCM memory controller 211. The VCM devices may be interconnected within main memory 203 in a manner where groups of j devices are operated in unison, yielding an aggregate block of memory accessible through a given buffer group of size jk, where k is the amount of memory accessible through one device buffer. Whether buffers are used singularly or in unitized groups, they are managed as a unit, where each unit can be identified independently with a buffer number (B#). Because the fully associative buffers exist within the VCM 203 devices, external to the control chip 202, a fully associative directory 212 is required within the control chip to keep track of the remote buffer usage. One directory entry 213 is maintained for each of the n associative buffers, where each entry is comprised of a register 214 and a comparator 215. The register contains at least a block tag address field and a valid bit, where the block tag address indicates which of the possible memory blocks is accessible through the associated buffer and the valid bit indicates if the buffer is valid.

The comparator 213 signals "hit" to the memory controller when a memory request block address tag equals that of the directory entry block tag address, and the associated valid bit is asserted. When a memory request "hits" a directory entry associated with a SDRAM row, the memory controller 211 presents a read or write request to the memory array 203. When a memory request does not hit a directory entry, then the memory controller must present an "activate" command to open the row in the memory array 203. However, if a directory entry replacement is required, then memory controller 211 must first issue a "precharge" command to close the row for the replaced directory entry tag address, before opening the new row.

Figure 3:
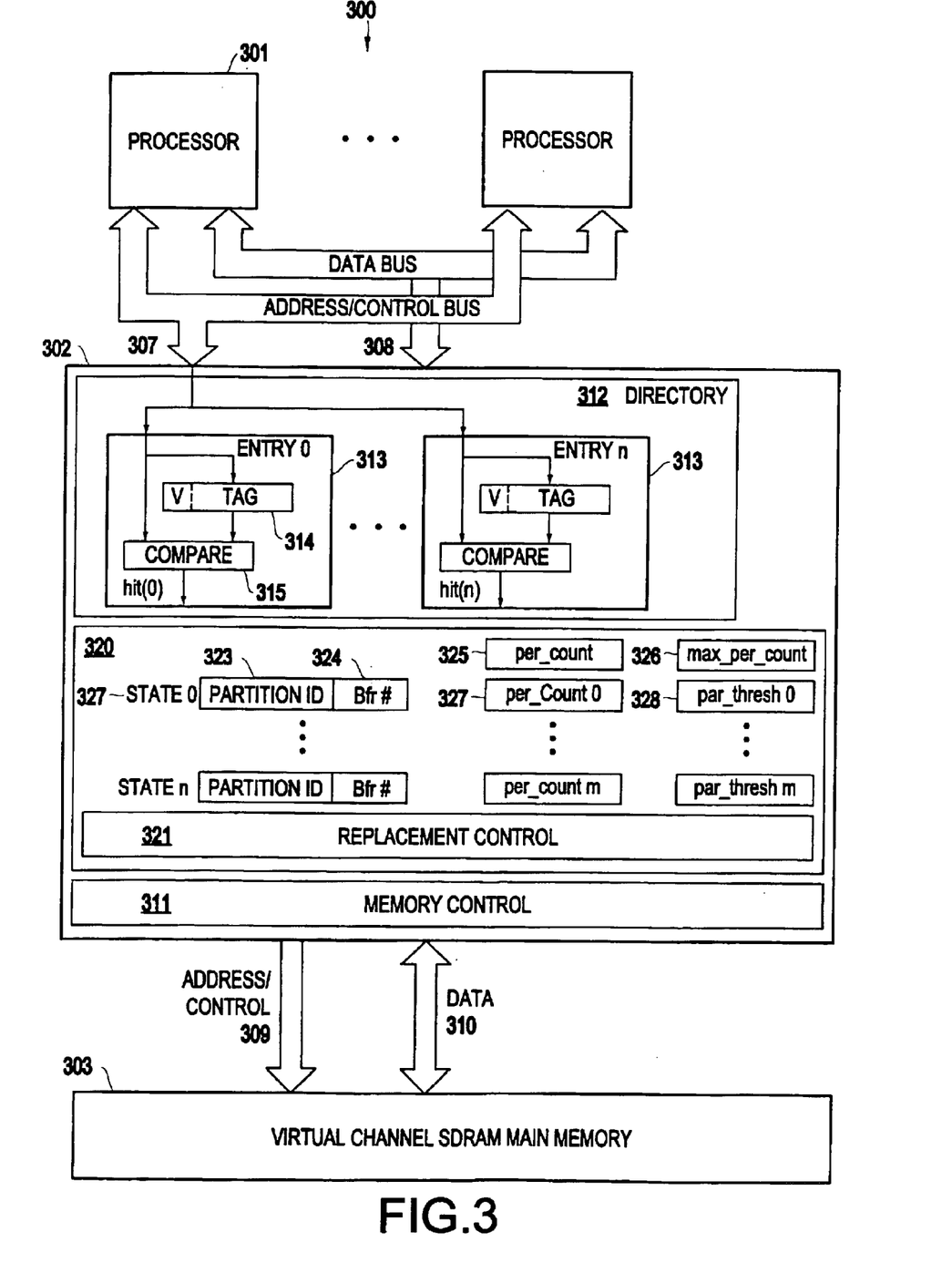
FIG. 3 illustrates the processing system having an apparatus managing a Virtual Channel Memory array.

Referring to FIG. 3, shown is a processing system 300, having a buffer management control logic 320, and its associated support hardware, that manage the utilization of the buffers and indicate to the memory controller 320 what type of memory activity will be requested of the memory controller 311. A state register (SR) 322 is also employed for each of the n associative buffers, where each register is comprised of a partition ID (PID) field 323 and a buffer number (B#) field 324. Each register correlates a given buffer to one of m partitions. This register set is arranged and managed as a least recently used (LRU) stack, such that the most recently used buffer is located at the top of the stack, and that the LRU buffer is located at the bottom of the stack. Each time a memory reference hits a valid buffer, the respective SR (or associated pointer) is moved from its current position in the stack to the top of the stack. Should a memory reference miss a buffer, the buffer replacement control 321 is responsible for selecting a buffer for allocation, and replacing the LRU buffer from the bottom of the stack, when an invalid buffer is not available. Memory accesses from an agent, other than is targeted to a partition, which hit in a partition are treated as though the access belongs to the partition. This prevents duplicating or migrating a buffer address between partitions, and insures that every address is unique across all partitions.

A persistence counter 325, capable of counting to a magnitude n or greater, provides the means to establish a reference rate quanta for normalizing reference rates to the respective partitions. The counter is decremented for every valid a memory request. A programmable counter threshold register 326 provide a means to establish the size of the reference rate quanta, which may be changed to accommodate performance optimizations or the aggregation of partitions in a smaller set of larger partitions. The persistence counter 325 is loaded with the threshold register 326 value when the persistence counter underflows (i.e., is decremented and is zero). A partition reference counter 327 is maintained for each of the m partitions, along with an associated partition utilization threshold 328 for establishing the threshold where a given partition utilization can be gauged.

Although this embodiment employs four fixed equal size partitions, corresponding to one partition per processor in a maximum 4-processor system, an alternative embodiment may employ programmable partition size and quantity. Moreover, an alternative embodiment might also employ a programmable handicap register for each partition to have a means to establish a handicap or advantage, over other partitions in the complex. This advantage can be provided as a higher partition count start point or a weighting to have the count advance at a rate more than one per access.

Figure 4A:
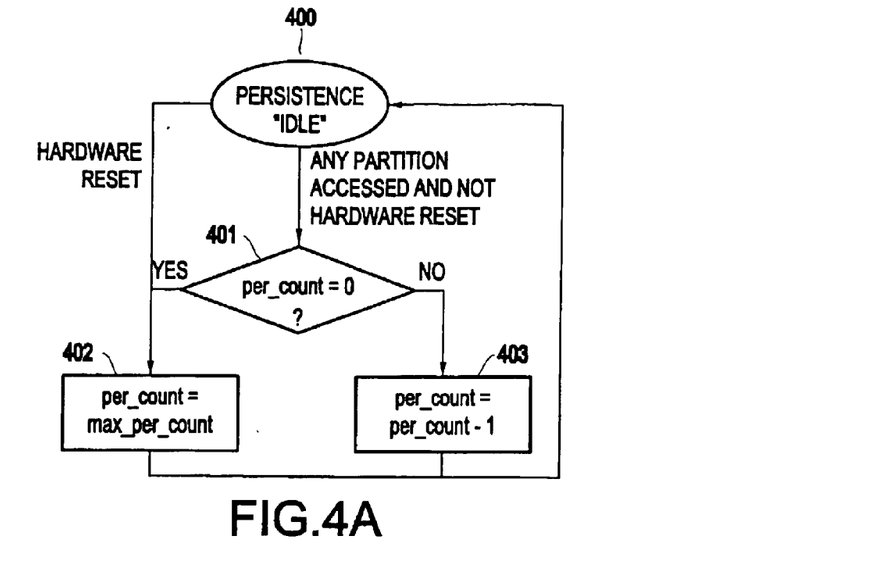
FIGS. 4A–4C illustrates state diagrams for the methods relating to the present invention.
Figure 4B:
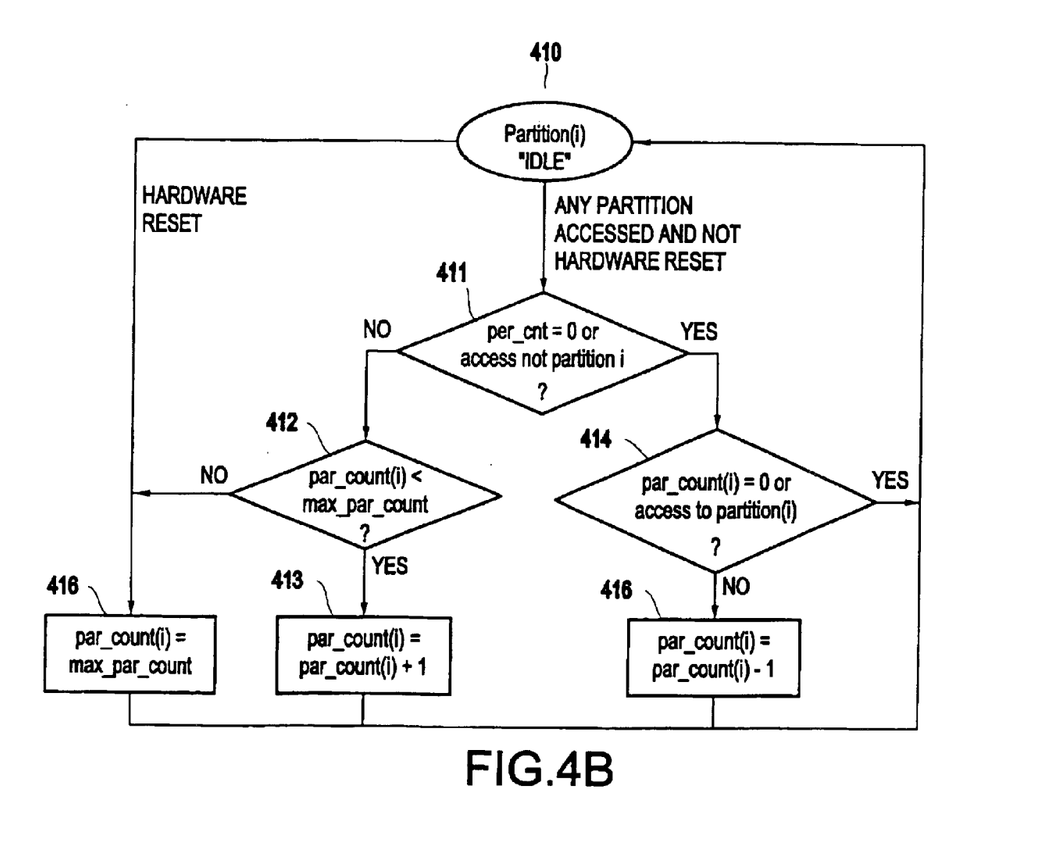
Figure 4C:
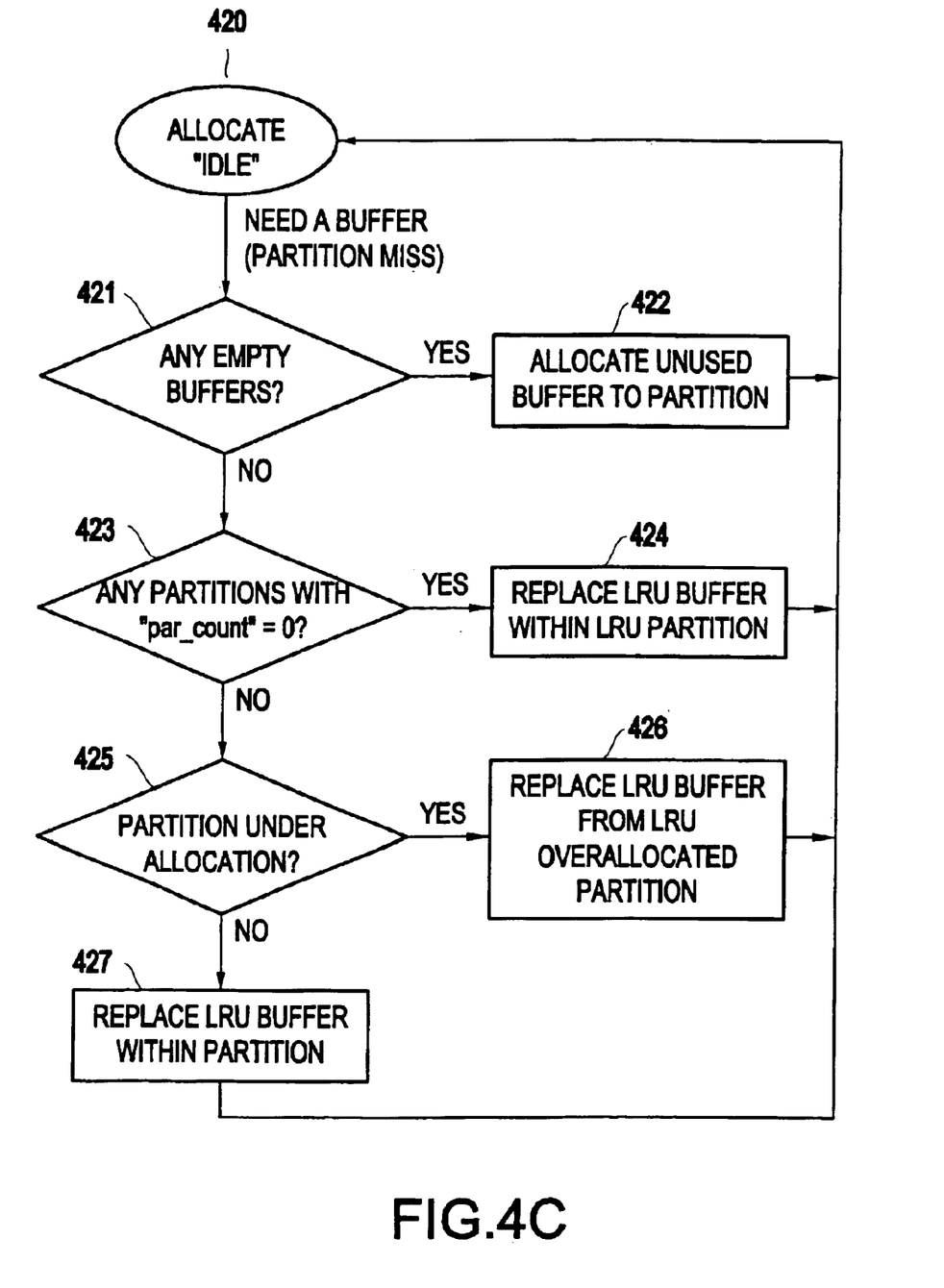

Referring to FIGS. 4A–4C, shown are the parallel operating state diagrams for the persistence counter, partition counters, and the allocation control for managing the buffers responsively to utilization. A hardware reset or any valid memory access condition from the persistence counter idle state 400, results in the persistence counter 325 initialization with a maximum value 326 at step 402 when the hardware is reset or when the counter 325 is zero and a valid memory access occurs at step 401. Otherwise, from step 401 the counter is decremented by one. Parallel to this behavior, each partition counter also operates independently from each other, such that each of the m partitions maintains a count of memory accesses through the respective buffer set. Responsive to a hardware reset condition while a partition counter state machine is in the idle state 410, the partition counter 327 is initialized to the maximum partition count at step 416. Without a reset condition and when any partition is accessed, if the persistence counter is zero or the access is not to partition(i) at step 411, and the partition counter(i) is zero or the access is to or hits partition(i), then control returns to the idle state from step 414. Otherwise from step 414, the partition counter(i) is decremented registering a degree of inactivity until zero. Otherwise from step 411, and the partition count(i) is less than the maximum partition count at step 412, then control returns to the idle state because the partition count is maximized. Otherwise from step 412, the partition counter(i) is incremented, indicating an increased degree of activity, before control returns to idle state.

The allocation control is responsive to a buffer miss in all partitions, and serves to allocate a buffer to be used for the new request, most often displacing a valid buffer. After such a condition at step 420, and then on to step 421, if any invalid directory entry is available, then an associated buffer is allocated to the partition associated with the request at step 422. As is the case with any replacement, the directory entry is updated with the memory address block tag and the valid bit is set. The corresponding state register (SR) is loaded with the partition ID and buffer number, and is moved to the most recently used position in the LRU stack. Otherwise from step 421, all directory entries are valid, then on to step 423, if any partition counters indicate insufficient activity (partition count(i) is zero), the least recently used buffer in the least recently used partition with a partition count equal to zero is selected for replacement at step 424. Otherwise from step 423, then on to step 425, no partitions are under utilized and if the current partition is under allocated (i.e., has fewer buffers than the base allocation), then the least recently used buffer in the least recently used partition with an over allocation of buffers is selected for replacement at step 426. Otherwise from step 425, the least recently used buffer in the current partition is selected for replacement.

Therefore, as shown above, the invention allocates the various buffers into different partitions and keeps track of such allocations using the table 322 shown above. Once a resource (buffer) is allocated to a partition, that resource is available only (strictly dedicated) to the agent (or agents) who own or control that partition. The invention bases these allocations upon the buffer activity level of each agent or partition. In other words, some agents will require a larger number of buffers while other agents will require a smaller number, and this will change over time. The invention allows those agents that require more buffers to be allocated partitions with more buffers. To the contrary, if less buffers are needed by a given agent, their associated partition will maintain a smaller number of buffers.

The invention initially allocates all buffers equally between the different agents. This initial allocation is referred to as the base allocation. The base allocation can divide all the buffers equally among the partitions or the base allocation can provide a minimum number of buffers to each partition and leave some buffers as unused and available. Then, as more buffers are needed, the various partitions first utilize the unused and unpartitioned buffers. After that, the partitions are continuously reallocated between the different buffers, depending upon usage histories.

As the buffers are used, the invention tracks the buffer usage within each partition to determine whether the partitions are being underallocated or overallocated buffers. More specifically, the invention tracks buffer usage by maintaining the partition counter (par_count) that provides a history of which partitions regularly use their buffers and which partitions do not regularly use their buffers. The invention initially sets the partition counters at a specific value 416. In one form of the invention, at each memory access, a given partition has the partition counter incremented when a memory access is made to a buffer in that partition (413) while the remaining non-accessed partitions have their partition counter decremented (415). In this way, partitions that use their buffers less frequently will have lower values in their partition counters and those partitions that use their buffers more regularly will have higher partition counts. Then, when a partition needs an additional buffer, and no unused buffers are available, the partition counters of other partitions will be checked and those with partition counts below a threshold will lose a buffer to the partition needing the buffer.

In a more sophisticated embodiment, the invention uses the persistence counter 325 to limit the number of times the partition counter is decremented. More specifically, the processing shown in FIGS. 4A and 4B only allow a partition counter associated with a non-accessed partition to be decremented when the persistence counter has reached zero (414, 415), at which time the persistence counter is immediately preset to the maximum persistence counter 326, as shown in items 401, 402. Therefore, the invention slows and the rate at which the partition counters are decremented through the use of the persistence counter 325. As mentioned above, this slowing rate can be adjusted by changing the maximum persistence counter 326.

When reallocating the resources among the agents the invention uses a number of different restrictions to determine which partitions will lose buffers, which buffers will be removed, and which partitions will be allowed to gain buffers. For example, the invention may only allow a partition to lose buffers if the partition count goes below a specific number (or reaches zero). Similarly, a partition may only be allowed to gain buffers if its partition counter is above a specific number (or is at a maximum). Therefore, in a very simplified example, a partition could be classified as being overallocated partitions only when its partition counter it is at 0. Similarly, in this simplified example, a partition could be classified as being underallocated partitions only when it's partition counter is equal to the maximum partition counter.

Further, when taking a buffer from a partition, different methodologies can be used. In one example, the least recently used methodology is used to take buffers from an overallocated partition. the invention can also set minimums so that each partition always maintains at least a minimum number of buffers. Alternatively, the invention can allow partitions to have no buffers. In a similar manner, the invention can sat a maximum number of buffers maintainable by each partition. These variables can be changed by the designer to maximize the performance of a specific system.

Therefore, the invention dynamically allocates buffers among different partitions to provide different agents associated with each of the partitions the appropriate quantity of buffers. Further, the invention constantly adjusts the number of buffers in each partition, depending upon usage. By dynamically controlling the number of buffers available to the different agents, the invention makes the system more efficient and allows all agents equal access to as many buffers as can be made available depending upon the agents needs and usage histories.

While the invention has been described in terms of preferred embodiments, those skilled in the art will recognize that the invention can be practiced with modification within the spirit and scope of the appended claims.

What is claimed is:

1. A system connected to agents and to associative resources, said system comprising:
   a first controller associated with said associative resource;
   a directory associated with said agents; and
   a resource management controller associated with said directory, wherein said resource management control is adapted to allocate a distribution of said associative resources into partitions, wherein each of said partitions is associated with at least one of said agents;
   wherein said resource management control includes:
      a replacement controller associated with said first controller; and
      a counter associated with said replacement controller and being adapted to record a usage history for each of said partitions, wherein said replacement controller is adapted to reallocate said distribution of said associative resources within each of said partitions as a function of said usage history, and
      a threshold register for each of said partitions for storing a threshold, wherein a predetermined minimum allocation of said associative resources is maintained in each of said partitions that have a usage history above said threshold.

2. The system in claim 1, wherein said counter is adapted to maintain a count for each partition of how frequently associative resources within said partitions are accessed.

3. The system in claim 1, wherein said replacement controller is further adapted to continuously reallocate said distribution of said associative resources.

4. The system in claim 3, wherein said replacement controller is adapted to reallocate said distribution of said associative resources by adding associative resources to partitions with higher use levels and removing associative resources from partitions with lower use levels.

5. The system in claim 1, further comprising a state register associated with said replacement controller, wherein said state register is adapted to identify the partition in which each associative resource is located.

6. The system in claim 1, wherein said state registers comprise an individual state register for each of said associative resources.

7. The system in claim 6, wherein each of said state registers includes an identifier tag that identifies the partition in which each associative resource is located.

8. A processing system connected to processors and to a memory having buffers, said processing system comprising:
   a memory controller operatively connected to said memory;
   a directory operatively connected to said processors; and
   a buffer management controller operatively connected to said directory, wherein said buffer management control is adapted to allocate a distribution of said buffers into partitions, wherein each of said partitions is associated with at least one of said processors;
   wherein said buffer management control includes:
      a replacement controller operatively connected to said memory controller; and
      a counter operatively connected to said replacement controller adapted to record a usage history for each of said partitions, wherein said replacement controller is adapted to reallocate said distribution of said buffers within each of said partitions as a function of said usage history, and
      a threshold register for each of said partitions for storing a threshold, wherein a predetermined minimum allocation of said buffers is maintained in each of said partitions that have a usage history above said threshold.

9. The system in claim 8, wherein said counter is adapted to maintain a count for each partition of how frequently buffers within said partitions are accessed.

10. The system in claim 8, wherein said replacement controller is further adapted to continuously reallocate said distribution of said buffers.

11. The system in claim 10, wherein said replacement controller is adapted to reallocate said distribution of said buffers by adding buffers to partitions with higher use levels and removing buffers from partitions with lower use levels.

12. The system in claim 8, further comprising a state register operatively connected to said replacement controller, wherein said state register is adapted to identify the partition in which each buffer is located.

13. The system in claim 8, wherein said state registers comprise an individual state register for each of said buffers.

14. The system in claim 13, wherein each of said state registers includes an identifier tag that identifies the partition in which each buffer is located.

15. A method for allocating associative resources among a plurality of agents, said method comprising:
   allocating a distribution of said resources into partitions, wherein each of said partitions is associated with at least one of said agents;

recording a usage history for each of said partitions;

reallocating said distribution of said resources within each of said partitions as a function of said usage history; and maintaining a predetermined minimum allocation of said associative resources to each of said partitions that have a usage history above a predetermined threshold.

16. The method in claim 15, further comprising repeating said recording and reallocating.

17. The method in claim 15, wherein said reallocating comprises adding resources to partitions with higher use levels and removing resources from partitions with lower use levels.

18. The method in claim 15, wherein said recording of said usage history comprises maintaining a count for each partition of how frequently resources within said partition are accessed.

19. The method in claim 18, wherein said resources can only be reallocated between said partitions when said count exceeds a predetermined value.

20. The method in claim 15, wherein said allocating comprises attaching an identifier tag to said resources, wherein said identifier tag identifies the partition in which each resource is located.

21. A method for allocating buffers among a plurality of processors, said method comprising:

allocating a distribution of said buffers into partitions, wherein each of said partitions is associated with at least one of said processors;

recording a usage history for each of said partitions;

reallocating said distribution of said buffers within each of said partitions as a function of said usage history; and maintaining a predetermined minimum allocation of said buffers to each of said partitions that have a usage history above a predetermined threshold.

22. The method in claim 21, further comprising repeating said recording and reallocating.

23. The method in claim 21, wherein said reallocating comprises adding buffers to partitions with higher use levels and removing buffers from partitions with lower use levels.

24. The method in claim 21, wherein said recording of said usage history comprises maintaining a count for each partition of how frequently buffers within said partition are accessed.

25. The method in claim 24, wherein said buffers can only be reallocated between said partitions when said count exceeds a predetermined value.

26. The method in claim 21, wherein said allocating comprises attaching an identifier tag to said buffers, wherein said identifier tag identifies the partition in which each buffer is located.

27. A program storage device readable by machine tangibly embodying a program of instruction executable by said machine for performing a method of allocating associative resources among a plurality of agents, said method comprising:

allocating a distribution of said resources into partitions, wherein each of said partitions is associated with at least one of said agents;

recording a usage history for each of said partitions;

reallocating said distribution of said resources within each of said partitions as a function of said usage history; and maintaining a predetermined minimum allocation of said associative resources to each of said partitions that have a usage history above a predetermined threshold.

28. The program storage device in claim 27, wherein said method further comprises repeating said recording and reallocating.

29. The program storage device in claim 27, wherein said reallocating comprises adding resources to partitions with higher use levels and removing resources from partitions with lower use levels.

30. The program storage device in claim 27, wherein said recording of said usage history comprises maintaining a count for each partition of how frequently resources within said partition are accessed.

31. The program storage device in claim 30, wherein said resources can only be reallocated between said partitions when said count exceeds a predetermined value.

32. The program storage device in claim 31, wherein said allocating comprises attaching an identifier tag to said resources, wherein said identifier tag identifies the partition in which each resource is located.

* * * * *